3,121,095
α-ENOLACYLATES OF β-ACYL-γ-PHENYL-
α-TETRONIC ACIDS
Gerhard Ohnacker, Biberach an der Riss, Germany, assignor to Dr. Karl Thomae G.m.b.H., Biberach an der Riss, Germany, a corporation of Germany
No Drawing. Filed July 17, 1961, Ser. No. 124,364
Claims priority, application Germany July 23, 1960
5 Claims. (Cl. 260—343.6)

This invention relates to α-enolacylates of β-acyl-γ-phenyl-α-tetronic acids and to various methods of preparing such compounds.

More particularly, the present invention relates to compounds of the formula

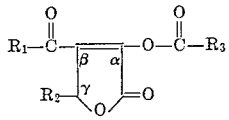
(I)

wherein $R_1$ is a straight- or branched-chain alkyl or alkenyl substituent with 1 to 9 carbon atoms,
$R_2$ is a phenyl substituent which may have a lower alkyl, lower alkoxy or methylenedioxy grouping attached thereto, and
$R_3$ is a lower alkyl substituent.

The term "α-tetronic acid" as used herein is intended to designate 2,3-diketo-tetrahydrofuran or its tautomeric enol form 2-keto-3-hydroxy-2,5-dihydrofuran of the formulas

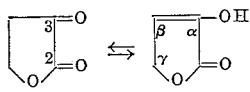

which exist in equilibrium (see P. Karrer, Lehrbuch der Organischen Chemie, 11th edition, page 824).

The compounds according to the present invention may conveniently be prepared by acylating a β-acyl-γ-phenyl-α-tetronic acid of the formula

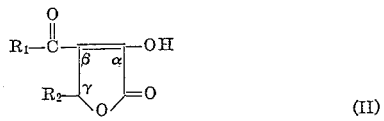
(II)

wherein $R_1$ and $R_2$ have the meanings previously defined in connection with Formula I. This acylation may be effected by means of a variety of common acylating agents, but the following methods have been found to be most convenient and efficient.

METHOD A

By reacting a β-acyl-γ-phenyl-α-tetronic acid of the Formula II above with a carboxylic acid anhydride of the formula $$(R_3CO)_2O \qquad (III)$$

wherein $R_3$ has the same meaning as previously defined in connection with Formula I, at elevated temperatures and preferably with a stoichiometric excess of the acid anhydride III. The acylation reaction may be carried out, if desired, in the presence of a suitable inert organic solvent, such as benzene or toluene. The acylation reaction mixture is worked up in well known fashion by distilling off the excess unreacted acid anhydride as well as the inert organic solvent medium, if one is used, and recrystallizing the distillation residue from a suitable solvent.

METHOD B

By reacting a β-acyl-γ-phenyl-α-tetronic acid of the Formula II above with a mixed carboxylic acid anhydride of the formula $$R_3\text{—CO—O—}R_4 \qquad (IV)$$

wherein $R_3$ has the same meaning as previously defined and $R_4$ is an activating radical, such as a carbalkoxy group (—OCO alkyl). The reaction is advantageously performed in the presence of an inert organic solvent, such as ether, benzene, dioxane or tetrahydrofuran, and at either room temperature or moderately elevated temperatures. Equimolar amounts of the reactants are preferably employed.

The mixed anhydride IV does not need to be isolated from the reaction mixture resulting from its own method of preparation prior to its employment in the present acylation reaction. Thus, the mixed anhydride may be prepared, for example, by reacting a carboxylic acid $R_3$COOH with a chloroformic acid alkyl ester in a suitable solvent and in the presence of a tertiary organic base, and thereafter a solution of the desired β-acyl-γ-phenyl-α-tetronic acid may directly be added to the reaction mixture.

The acylation reaction generally goes to completion in about thirty minutes without external heating. The acylation reaction mixture is worked up in the customary manner by washing the organic phase with water, distilling off the solvent from the washed organic phase and recrystallizing the distillation residue from a suitable solvent.

METHOD C

By reacting a β-acyl-γ-phenyl-α-tetronic acid of the Formula II with a carboxylic acid halide of the formula $$R_3\text{—CO—Hal} \qquad (V)$$

wherein $R_3$ has the meaning previously defined and Hal is halogen, in the presence of an agent capable of neutralizing or tying up the hydrohalic acid formed by the reaction and, if desired, in the presence of an inert solvent or diluent. The acylating reaction may be performed, while cooling, at either room temperature or moderately elevated temperatures. The agent capable of neutralizing or tying up the hydrohalic acid formed by the acylating reaction may be an inorganic base, such as an alkali metal carbonate, or also a tertiary organic base, such as triethylamine, dimethylaniline, pyridine or quinoline. It is advantageous to use at least 1 mol of the hydrohalic acid-binding agent per mol of the two reactants. In the event that a tertiary organic base is used as the hydrohalic acid-binding agent, this base may also be employed as the inert solvent or diluent by providing a suitable excess of the base over and above the amount stoichiometrically necessary to neutralize or tie up the theoretical amount of hydrohalic acid split off by the acylating reaction. Other suitable solvents or diluents are the customary inert organic solvents, such as ether, chloroform, benzene, dioxane and tetrahydrofuran, to mention only a few.

After the acylation reaction has gone to completion the salt formed by the hydrohalic acid and the acid-binding agent is either separated by vacuum filtration or washed out of the reaction solution with water, the organic phase is washed until neutral, the inert solvent which may be present is distilled off and the distillation residue is recrystallized as usual from a suitable solvent.

METHOD D

By reacting a β-acyl-γ-phenyl-α-tetronic acid of the Formula II with a ketene of the formula $$R_5\text{—CH=C=O} \qquad (VI)$$

wherein $R_5$ is either hydrogen or a straight- or branched-chain alkyl or alkenyl radical with 1 to 8 carbon atoms. The reaction is advantageously performed in an inert solvent medium, such as ether, benzene, tetrahydrofuran or dioxane, and under elevated pressures of a gaseous ketene or a ketene with a low boiling point is used. It is preferred to use the ketene reactant in an amount which is moderately in excess of the equimolar quantity relative to the tetronic acid compound II. The acylating reaction proceeds at room temperature or moderately cooler temperatures. After completion of the reaction the organic phase is washed, and subjected to distillation to remove the inert solvent and any excess unreacted ketene which might be present, and the distillation residue is recrystallized from a suitable solvent in the usual manner.

The β-acyl-γ-phenyl-α-tetronic acid compounds of the Formula II above, which are used as starting materials in the above-described methods, may be prepared by well known procedures, such as by reacting an α,β-diketo-carboxylic acid with an unsubstituted or substituted benzaldehyde, as described by Keskin, Rev. Faculté sci. univ. Istanbul, 9A, 135 (1944). For instance, β-butyryl-γ-phenyl-α-tetronic acid of the formula

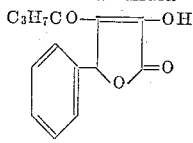

may be prepared from butyryl-pyruvic acid and benzaldehyde by allowing a mixture of these reactants to stand at room temperature in the presence of a basic catalyst, such as piperidine.

Examples of other β-acyl-γ-phenyl-α-tetronic acids, which may be prepared in analogous fashion and used as starting materials in Methods A through D above, are the following:

(1) β-acetyl-γ-phenyl-α-tetronic acid; M.P. 170–172° C. (from dil. ethanol)
(2) β-acetyl-γ-(p-methoxy-phenyl)-α-tetronic acid; M.P. 153–155° C. (from dil. ethanol)
(3) β-acetyl-γ-(m,p-methylenedioxy-phenyl) - α - tetronic acid; M.P. 188–189° C. (from ethanol)
(4) β-acetyl-γ-(o-chloro-phenyl)-α-tetronic acid; M.P. 118–119° C. (from ethanol)
(5) β-acetyl-γ-(p-chloro-phenyl)-α-tetronic acid; M.P. 154° C. (from water)
(6) β-propnioyl-γ-phenyl-α-tetronic acid; M.P. 178–179° C. (from dil. methanol)
(7) β-propionyl-γ-(p-methyl-phenyl)-α-tetronic acid; M.P. 148–150° C. (from dil. methanol)
(8) β-propionyl-γ-(p-methoxy-phenyl) - α-tetronic acid; M.P. 167–168° C. (from dil. methanol)
(9) β-propionyl-γ-(p-chloro-phenyl)-α-tetronic acid; M.P. 167–169° C. (from dil. methanol)
(10) β-butyryl-γ-phenyl-α-tetronic acid; M.P. 129° C. (from methanol)
(11) β-butyryl-γ-(p-methyl-phenyl)-α-tetronic acid; M.P. 124–125° C. (from dil. methanol)
(12) β-butyryl-γ-(p-methoxy-phenyl) - α - tetronic acid; M.P. 122–123° C. (from ethanol)
(13) β-butyryl-γ-(p-chloro-phenyl)-α-tetronic acid; M.P. 150–155° C. (from ethanol)
(14) β-isobutyryl-γ-phenyl-α-tetronic acid; M.P. 212–213° C. (from ethanol)
(15) β-isobutyryl-γ-(p-methyl-phenyl) - α-tetronic acid; M.P. 184–185° C. (from methanol)
(16) β-isobutyryl-γ-(p-methoxy-phenyl)-α-tetronic acid; M.P. 173–174° C. (from methanol)
(17) β-isobutyryl-γ - (m,p-methylenedioxy-phenyl) -α-tetronic acid; M.P. 190–191° C. (from methanol)
(18) β-isobutyryl-γ - (o-chloro-phenyl) -α-tetronic acid; M.P. 211–212° C. (from methanol)
(19) β-isobutyryl- γ - (p-chloro-phenyl)-α-tetronic acid; M.P. 200–201° C. (from methanol)
(20) β-pentanoyl-γ-phenyl-α-tetronic acid; M.P. 128–129° C. (from methanol)
(21) β-pentanoyl-γ-(p-methyl-phenyl) - α-tetronic acid; M.P. 85–86° C. (from methanol)
(22) β-methylethylacetyl-γ-phenyl-α-tetronic acid; M.P. 138–139° C. (from methanol)
(23) β-methylethylacetyl-γ-(p-methyl-phenyl)-α-tetronic acid; M.P. 130–131° C. (from methanol)
(24) β-methylethylacetyl-γ-(p-methoxy-phenyl)-α-tetronic acid; M.P. 132–134° C. (from dil. methanol)
(25) β-methylethylacetyl-γ - (m,p-methylenedioxy-phenyl)-α-tetronic acid; M.P. 124–125° C. (from methanol)
(26) β-methylethylacetyl-γ-(o-chloro-phenyl)- α-tetronic acid; M.P. 135° C. (from dil. methanol)
(27) β-methylethylacetyl-γ-(p-chloro-phenyl)- α-tetronic acid; M.P. 150–151° C. (from methanol)
(28) β-(3,3-dimethyl-acryiyl) - γ-phenyl-α-tetronic acid; M.P. 160–161° C. (from methanol)
(29) β-(3,3-dimethyl-propanoyl)-γ-phenyl-α-tetronic acid; M.P. 155–156° C. (from methanol)
(30) β-(3,3-dimethyl-propanoyl)-2 - (p- methyl-phenyl)-α-tetronic acid; M.P. 110–111° C. (from methanol)
(31) β-(3,3-dimethyl-propanoyl)-γ-(p-methoxy-phenyl)-α-tetronic acid; M.P. 138–139° C. (from dil. methanol)
(32) β-(3,3-dimethyl-propanoyl)-γ-(o-chloro-phenyl)-α-tetronic acid; M.P. 128–129° C. (from methanol)
(33) β-(3,3-dimethyl-propanoyl)-γ- (p-chloro-phenyl)-α-tetronic acid; M.P. 161–162° C. (from dil. methanol)
(34) β-trimethylacetyl-γ-phenyl - α -tetronic acid; M.P. 160–162° C. (from gasoline)
(35) β-trimethylacetyl-γ- (p-methyl - phenyl) - α-tetronic acid; M.P. 149–150° C. (from gasoline)
(36) β-trimethylacetyl-γ-(p-methoxy-phenyl) - α-tetronic acid; M.P. 174–175° C. (from gasoline)
(37) β-trimethylacetyl-γ - (m,p-methylenedioxy-phenyl)-α-tetronic acid; M.P. 181–182° C. (from gasoline)
(38) β-trimethylacetyl - γ - (o-chloro-phenyl) - α-tetronic acid; M.P. 139–142° C. (from methanol)
(39) β-trimethylacetyl - γ - (p-chloro-phenyl) - α-tetronic acid; M.P. 190–191° C. (from dil. methanol)
(40) β-(n-caproyl)-γ-phenyl-α-tetronic acid; M.P. 115–116° C. (from ethanol)
(41) β-(n-caproyl)-γ-(p-methyl-phenyl)-α-tetronic acid; M.P. 87–90° C. (from methanol)
(42) β-(n-caproyl)-γ- (p - methoxy - phenyl) - α-tetronic acid; M.P. 96–97° C. (from dil. methanol)
(43) β-(n-caproyl)-γ-(m,p-methylenedioxy-phenyl)-α-tetronic acid; M.P. 109–111° C. (from dil. methanol)
(44) β-(n-caproyl)-γ-(p-chloro-phenyl)-α-tetronic acid; M.P. 150–151° C. (from methanol)
(45) β-(n-heptanoyl)-γ-phenyl-α-tetronic acid; M.P. 137–139° C. (from methanol)
(46) β-(n-heptanoyl)-γ-(p - methyl - phenyl) - α-tetronic acid; M.P. 52–53° C. (from dil. methanol)
(47) β-(n-heptanoyl)- γ - (p-methoxy-phenyl)-α-tetronic acid; M.P. 83–85° C. (from ethanol)
(48) β-(n-heptanoyl)-γ-(m,p-methylenedioxy-phenyl)-α-tetronic acid; M.P. 124–126° C. (from ethanol gasoline)
(49) β-(α'-methyl-n-hexanoyl)-γ-phenyl-α-tetronic acid; M.P. 141° C. (from methanol)
(50) β-(α'-methyl-n-hexanoyl)- γ - (p-methyl-phenyl)-α-tetronic acid; M.P. 134–135° C. (from gasoline)
(51) β-(α'-methyl-n-hexanoyl) - γ - (p-chloro-phenyl)-α-tetronic acid; M.P. 154–156° C. (from methanol)
(52) β-(4,4-dimethyl-3,4-pentenoyl) -γ-phenyl-α-tetronic acid; M.P. 124–125° C. (from methanol)
(53) β-(n-decanoyl)-γ-phenyl-α-tetronic acid; M.P. 128–129° C. (from ethanol)
(54) β-(n-decanoyl) - γ - (p - methyl - phenyl)-α-tetronic acid; M.P. 86–87° C. (from gasoline)
(55) β-(n-dodecanoyl)-γ-phenyl-α-tetronic acid; M.P. 90–92° C. (from ethanol)

The following examples illustrate the preparation of a number of representative members of the group of compounds embraced by Formula I above, using some of the above-listed β,γ-substituted α-tetronic acids as starting materials. It should be understood, however, that this invention is not limited solely to the compounds illustrated in these examples.

EXAMPLE I

*Preparation of the α-Enolacetate of β-Butyryl-γ-Phenyl-α-Tetronic Acid by Method A*

3.7 gm. of β-butyryl-γ-phenyl-α-tetronic acid were admixed with 30 cc. of acetic acid anhydride, and the resulting mixture was heated for three hours on a boiling water bath. Thereafter, the excess, unreacted acetic acid anhydride was distilled out of the reaction mixture under an aspirator pump vacuum. The distillation residue was recrystallized from ethanol, yielding 3 gm. (68% of theory) of the α-enolacetate of β-butyryl-γ-phenyl-α-tetronic acid of the formula

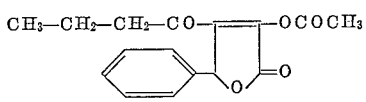

having a melting point of 54–55° C.

Using an analogous procedure, the following α-enolacetates were also prepared from the starting materials indicated in each instance:

(a) The α-enolacetate of β-acetyl-γ-phenyl-α-tetronic acid, M.P. 86–88° C. (recrystallized from ethanol) of the formula

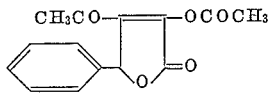

starting from β-acetyl-γ-phenyl-α-tetronic acid and acetic acid anhydride.

(b) The α-enolacetate of β-propionyl-γ-phenyl-α-tetronic acid, M.P. 81–82° C. (recrystallized from ethanol) of the formula

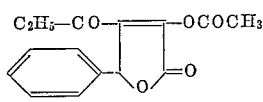

starting from β-propionyl-γ-phenyl-α-tetronic acid and acetic acid anhydride.

(c) The α-enolacetate of β-propionyl-γ-(p-chloro-phenyl)-α-tetronic acid, M.P. 94–95° C. (recrystallized from ethanol) of the formula

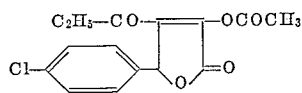

starting from β-propionyl-γ-(p-chloro-phenyl)-α-tetronic acid and acetic acid anhydride.

(d) The enolacetate of β-(dimethyl-acetyl)-γ-phenyl-α-tetronic acid, M.P. 90–92° C. (recrystallized from ethanol) of the formula

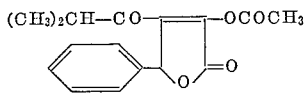

starting from β-(dimethyl-acetyl)-γ-phenyl-α-tetronic acid and acetic acid anhydride.

(e) The α-anolacetate of β-pentanoyl-γ-phenyl-α-tetronic acid, M.P. 67–68° C. (recrystallized from ethanol), of the formula

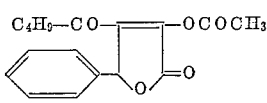

starting from β-pentanoyl-γ-phenyl-α-tetronic acid and acetic acid anhydride.

(f) The α-enolacetate of β-(α'-methyl-butyryl)-γ-phenyl-α-tetronic acid, M.P. 58–59° C. (recrystallized from ethanol) of the formula

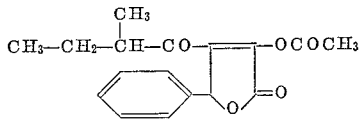

starting from β-(α'-methyl-butyryl)-γ-phenyl-α-tetronic acid and acetic acid anhydride.

(g) The α-enolacetate of β-(3',3'-dimethyl-propionyl)-γ-phenyl-α-tetronic acid, M.P. 50–52° C. (recrystallized from gasoline) of the formula

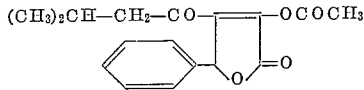

starting from β-(3',3'-dimethyl-propionyl)-γ-phenyl-α-tetronic acid and acetic acid anhydride.

(h) The α-enolacetate of β-trimethylacetyl-γ-phenyl-α-tetronic acid, M.P. 95–96° C. (recrystallized from ethanol) of the formula

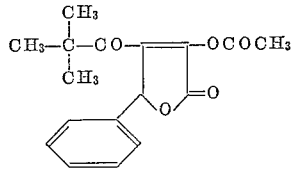

starting from β-trimethylacetyl-γ-phenyl-α-tetronic acid and acetic acid anhydride.

(i) The α-enolacetate of β-(n-hexanoyl)-γ-phenyl-α-tetronic acid, M.P. 69–70° C. (recrystallized from ethanol) of the formula

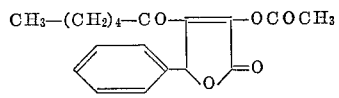

starting from β-(n-hexanoyl)-γ-phenyl-α-tetronic acid and acetic acid anhydride.

(j) The α-enolacetate of β-(n-heptanoyl)-γ-phenyl-α-tetronic acid, M.P. 74–76° C. (recrystallized from ethanol) of the formula

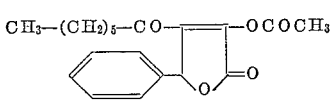

starting from β-(n-heptanoyl)-γ-phenyl-α-tetronic acid and acetic acid anhydride.

(k) The α-enolacetate of β-(2'-methyl-n-hexanoyl)-γ-phenyl-α-tetronic acid, M.P. 78–80° C. (recrystallized from methanol) of the formula

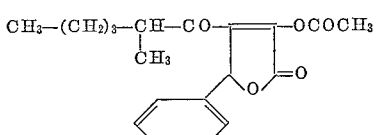

starting from β-(2'-methyl-hexanoyl)-γ-phenyl-α-tetronic acid and acetic acid anhydride.

(l) The α-enolacetate of β-(n-butyryl)-γ-(p-methyl-phenyl)-α-tetronic acid of the formula

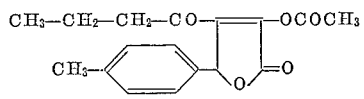

starting from β-(n-butyryl)-γ-(p-methyl-phenyl)-α-tetronic acid and acetic acid anhydride. The product was a non-distillable oil which remained behind after distilling the excess anhydride out of the reaction mixture.

(m) The α-enolacetate of β-(α'-methyl-butyryl)-γ-(p-methyl-phenyl)-α-tetronic acid of the formula

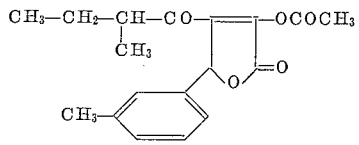

starting from β-(α'-methyl-butyryl)-γ-(p-methyl-phenyl)-α-tetronic acid and acetic acid anhydride. The product was a non-distillable oil which remained behind after distilling the excess anhydride out of the reaction mixture.

(n) The enolacetate of β-(3',3'-dimethyl-propionyl)-γ-(p-methyl-phenyl)-α-tetronic acid of the formula

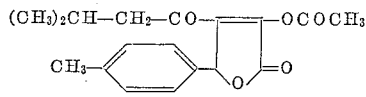

starting from β-(3',3'-dimethyl-propionyl)-γ-(p-methyl-phenyl)-α-tetronic acid and acetic acid anhydride. The product was a non-distillable oil which remained behind after distilling the excess anhydride out of the reaction mixture.

EXAMPLE II

*Preparation of the α-Enolpropionate of β-Isobutyryl-γ-Phenyl-α-Tetronic Acid by Method C*

4.8 gm. of β-isobutyryl-γ-phenyl-α-tetronic acid were dissolved in 100 cc. of ether and the solution was admixed with 1.5 gm. of pyridine and 1.8 gm. of propionyl chloride. The resulting reaction mixture was then allowed to stand at room temperature for four hours. Thereafter, 100 cc. of water were added, the mixture was shaken and the ether phase was decanted. The ether phase was then washed first with 20 cc. of 2 N hydrochloric acid, then with 20 cc. of a saturated aqueous sodium bicarbonate solution and finally twice with 20 cc. portions of water. The ethereal solution was then dried and the ether was distilled off. The residue was recrystallized from ethanol, yielding 4.3 gm. (72% of theory) of the α-enolpropionate of β-isobutyryl-γ-phenyl-α-tetronic acid, M.P. 99–100° C., of the formula

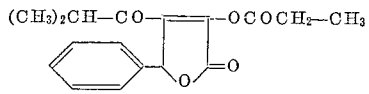

Using an analogous procedure, the following additional α-enolates were prepared:

(a) The α-enolbutyrate of β-dimethylacetyl-γ-phenyl-α-tetronic acid, M.P. 90–91° C. (recrystallized from ethanol) of the formula

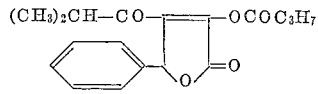

starting from β-dimethylacetyl-γ-phenyl-α-tetronic acid and butyryl chloride, with ether as the solvent and pyridine as the hydrochloric acid-binding agent.

(b) The α-enolacetate of β-dimethylacetyl-γ-(o-chloro-phenyl)-α-tetronic acid, M.P. 92–93° C. (recrystallized from ethanol of the formula

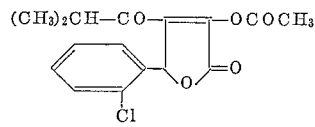

starting from β-dimethylacetyl-γ-(o-chloro-phenyl)-α-tetronic acid and acetyl chloride, with ether as the solvent and pyridine as the hydrochloric acid-binding agent.

(c) The α-enolacetate of β-(α'-methyl-butyryl)-γ-(o-chloro-phenyl)-α-tetronic acid, M.P. 61–63° C. (recrystallized from ethanol) of the formula

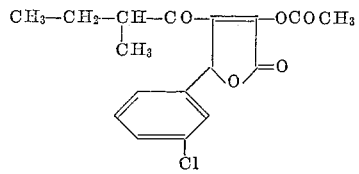

starting from β-(α'-methyl-butyryl)-γ-(o-chloro-phenyl)-α-tetronic acid and acetyl chloride, with ether as the solvent and triethylamine as the hydrochloric acid-binding agent.

(d) The α-enolacetate of β-(β',β'-dimethyl-acrylyl)-γ-phenyl-α-tetronic acid, M.P. 102–103° C. (recrystallized from ethanol) of the formula

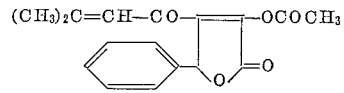

starting from β-(β',β'-dimethyl-acrylyl)-γ-phenyl-α-tetronic acid and acetyl chloride, with ether as the solvent and pyridine as the hydrochloric acid-binding agent.

(e) The α-enolacetate of β-(3',3'-dimethyl-propionyl)-γ-(o-chlorophenyl)-α-tetronic acid, M.P. 79–81° C. (recrystallized from methanol) of the formula

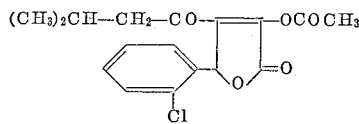

starting from β-(3',3'-dimethyl-propionyl)-γ-(o-chloro-phenyl)-α-tetronic acid and acetyl chloride, with ether as the solvent and pyridine as the hydrochloric acid-binding agent.

(f) The α-enolacetate of β-dimethyl-acetyl-γ-(p-chloro-phenyl)-α-tetronic acid, M.P. 94–96° C. (recrystallized from ethanol) of the formula

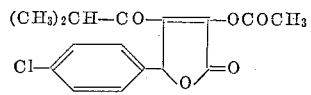

starting from β-dimethylacetyl-γ-(p-chloro-phenyl)-α-tetronic acid and acetyl chloride, with ether as the solvent and pyridine as the hydrochloric acid-binding agent.

(g) The α-enolacetate of β-(n-heptanoyl)-γ-(p-methyl-phenyl)-α-tetronic acid of the formula

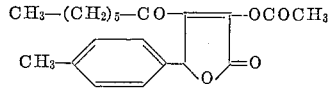

starting from β-(n-heptanoyl)-γ-(p-methyl-phenyl)-α-tetronic acid and acetyl chloride, with ether as the solvent and pyridine as the hydrochloric acid-binding agent. The product was a non-distillable oil which remained behind after distilling the ether out of the washed ether phase.

(h) The α-enolacetate of β-(4',4'-dimethyl-3',4'-pentenoyl)-γ-phenyl-α-tetronic acid, of the formula

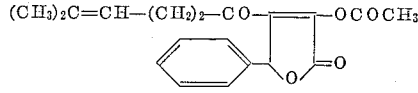

starting from β-(4',4-dimethyl-3',4'-pentenoyl)-γ-phenyl-α-tetronic acid and acetyl chloride, with ether as the solvent and pyridine as the hydrochloric acid-binding agent. The product was an undistillable oil which remained behind after distilling the ether out of the washed ether phase.

(i) The α-enolacetate of β-(n-decanoyl)-γ-phenyl-α-tetronic acid of the formula

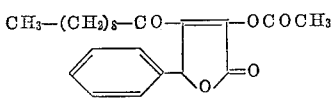

starting from β-(n-decanoyl)-γ-phenyl-α-tetronic acid and acetyl chloride, with ether as the solvent and pyridine as the hydrochloric acid-binding agent. The product was a non-distillable oil which remained behind after distilling the ether out of the washed ether phase.

(j) The α-enolacetate of β-(n-decanoyl)-γ-(p-methyl-phenyl)-α-tetronic acid of the formula

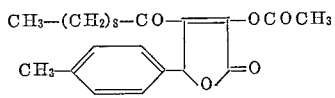

starting from β-(n-decanoyl)-γ-(p-methyl-phenyl)-α-tetronic acid and acetyl chloride, with ether as the solvent and pyridine as the hydrochloric acid-binding agent. The product was a non-distillable oil which remained behind after distilling the ether out of the washed ether phase.

(k) The α-enolacetate of β-dimethylacetyl-γ-(p-methyl-phenyl)-α-tetronic acid, M.P. 85–87° C. (recrystallized from ethanol) of the formula

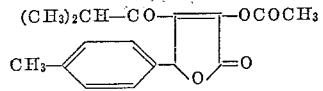

starting from β-dimethylacetyl-γ-(p-methyl-phenyl)-α-tetronic acid and acetyl chloride, with ether as the solvent and quinoline as the hydrochloric acid-binding agent.

(l) The α-enolacetate of β-(α'-methyl-hexanoyl)-γ-(p-methyl-phenyl)-α-tetronic acid, M.P. 60–62° C. (recrystallized from ethanol) of the formula

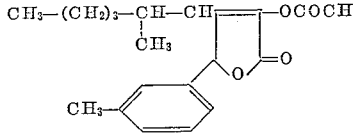

starting from β-(α'-methyl-hexanoyl)-γ-(p-methyl-phenyl)-α-tetronic acid and acetyl chloride, with ether as the solvent and pyridine as the hydrochloric acid-binding agent.

(m) The α-enolacetate of β-dimethylacetyl-γ-(p-methoxy-phenyl)-α-tetronic acid, M.P. 80–81° C. (recrystallized from ethanol) of the formula

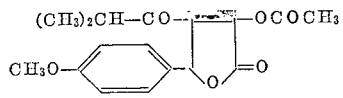

starting from β-dimethylacetyl-γ-(p-methoxy-phenyl)-α-tetronic acid and acetyl chloride, with ether as the solvent and pyridine as the hydrochloric acid-binding agent.

(n) The α-enolacetate of β-(n-hexanoyl)-γ-p-methoxyphenyl)-α-tetronic acid, M.P. 91–92° C. (recrystallized from ethanol) of the formula

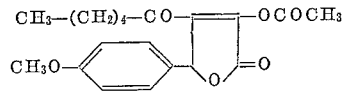

starting from β-(n-hexanoyl)-γ-(p-methoxy-phenyl)-α-tetronic acid and acetyl chloride, with ether as the solvent and pyridine as the hydrochloric acid-binding agent.

(o) The α-enolacetate of β-dimethylacetyl-γ-(m,p-methylenedioxy-phenyl)-α-tetronic acid, M.P. 88–89° C. (recrystallized from ethanol of the formula

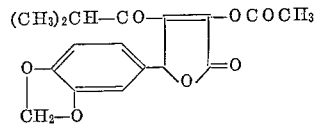

starting from β-dimethylacetyl-γ-(m,p-methylenedioxy-phenyl)-α-tetronic acid and acetyl chloride, with ether as the solvent and pyridine as the hydrochloric acid-binding agent.

(p) The α-enolacetate of β-(3',3'-dimethyl-propionyl)-γ-(p-chloro-phenyl)-α-tetronic acid, M.P. 65–67° C. (recrystallized from methanol) of the formula

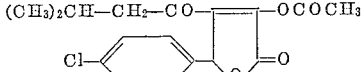

starting from β-(3',3'-dimethyl-propionyl)-γ-(p-chloro-phenyl)-α-tetronic acid and acetyl chloride, with ether as the solvent and pyridine as the hydrochloric acid-binding agent.

(q) The α-enolacetate of β-(3',3'-dimethyl-propionyl)-γ-(p-methoxy-phenyl)-α-tetronic acid, an oily substance of the formula

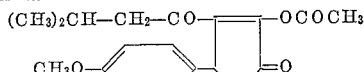

starting from β-(3',3'-dimethyl-propionyl)-γ-(p-methoxy-phenyl)-α-tetronic acid and acetyl chloride, with ether as the solvent and pyridine as the hydrochloric acid-binding agent.

(r) The α-enolacetate of β-(α'-methyl-butyryl)-γ-(p-methoxy-phenyl)-α-tetronic acid, an oily substance of the formula

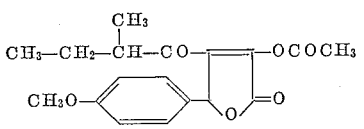

starting from β-(α'-methyl-butyryl)-γ-(p-methoxy-phenyl)-α-tetronic acid and acetyl chloride, with ether as the solvent and pyridine as the hydrochloric acid-binding agent.

(s) The α-enolacetate of β-(n-heptanoyl)-γ-phenyl-α-tetronic acid, M.P. 74–76° C. (recrystallized from ethanol) of the formula

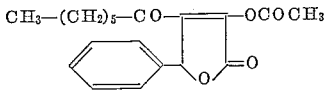

starting from β-(n-heptanoyl)-γ-phenyl-α-tetronic acid and acetyl chloride, with chloroform as the solvent and pyridine as the hydrochloric acid-binding agent.

EXAMPLE III

Preparation of the α-Enolacetate of β-(n-Heptanoyl)-γ-Phenyl-α-Tetronic Acid by Method C 133 gm. of β-(n-heptanoyl)-γ-phenyl-α-tetronic acid were dissolved in 900 cc. of dry tetrahydrofuran, and to this solution first 54.6 gm. of pyridine and then 54.3 gm. of acetyl chloride were added. The resulting reaction mixture was allowed to stand at room temperature for thirty minutes, during which time pyridine hydrochloride precipitated out. Thereafter, the precipitate was separated by vacuum filtration, and the filtrate was substantially freed from tetrahydrofuran by distillation in an aspirator vacuum. The distillation residue was then poured into a solution of 60 gm. of sodium bicarbonate in 1000 cc. of water, accompanied by vigorous stirring, whereby an initially oily product separated out which crystallized after a short period of time. The crystallized raw product was separated by vacuum filtration and was then dried and recrystallized from methanol. 128 gm. of the α-enolacetate of β-(n-heptanoyl)-γ-phenyl-α-tetronic acid, M.P. 74–76° C. of the formula

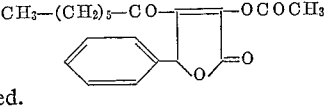

were obtained.

Using an analogous procedure, the following additional α-enolacetates were prepared:

(a) The α-enolacetate of β-(n-heptanoyl)-γ-phenyl-α-tetronic acid, M.P. 74–76° C. (recrystallized from ethanol) starting from β-(n-heptanoyl)-γ-phenyl-α-tetronic acid and acetyl chloride, with dioxane as the solvent and pyridine as the hydrochloric acid-binding agent.

(b) The α-enolacetate of β-(dimethyl-acetyl)-γ-(p-chloro-phenyl)-α-tetronic acid, M.P. 94–96° C. (recrystallized from methanol) of the formula shown in Example II(f) above, starting from β-(dimethyl-acetyl)-γ-(p-chloro-phenyl)-α-tetronic acid and acetyl chloride, with tetrahydrofuran as the solvent and pyridine as the hydrochloric acid-binding agent.

(c) The α-enolacetate of β-(n-hexanoyl)-γ-phenyl-α-tetronic acid, M.P. 69–70° C. (recrystallized from methanol) of the formula shown in Example I(i) above, starting from β-(n-hexanoyl)-γ-phenyl-α-tetronic acid and acetyl chloride, with tetrahydrofuran as the solvent and pyridine as the hydrochloric acid-binding agent.

(d) The α-enolacetate of β-(α'-methyl-hexanoyl)-γ-phenyl-α-tetronic acid, M.P. 78–80° C. (recrystallized from methanol) of the formula shown in Example I(k) above, starting from β-(2'-methyl-hexanoyl)-γ-phenyl-α-tetronic acid and acetyl chloride, with tetrahydrofuran as the solvent and pyridine as the hydrochloric acid-binding agent.

EXAMPLE IV

*Preparation of the α-Enolacetate of β-(n-Heptanoyl)-γ-Phenyl-α-Tetronic Acid by Method B*

A mixture of 1.08 gm. of chloroformic acid ethyl ester, 0.6 gm. of glacial acetic acid and 25 cc. of ether was prepared, and the mixture was cooled to 0° C. 0.79 gm. of pyridine were added, and five minutes thereafter a solution of 2.9 gm. of β-(n-heptanoyl)-γ-phenyl-α-tetronic acid in 100 cc. of ether was added. The resulting reaction mixture was allowed to stand for thirty minutes at room temperature. The ethereal solution obtained thereby was successively washed with water, with an aqueous sodium bicarbonate solution and again with water, dried over sodium sulfate, and the ether was distilled off in vacuo. The initially oily distillation residue was crystallized by trituration with methanol. 2.7 gm. of the α-enolacetate of β-(n-heptanoyl)-γ-phenyl-α-tetronic acid, M.P. 74–76° C., of the formula shown in Example I(j) were obtained.

EXAMPLE V

*Preparation of the α-Enolacetate of β-Caproyl-γ-Phenyl-α-Tetronic Acid by Method D*

0.03 mol of ketene was slowly introduced at room temperature into a solution of 5.4 gm. of β-caproyl-γ-phenyl-α-tetronic acid in 200 cc. of ether. Thereafter, the reaction solution was washed with an aqueous sodium bicarbonate solution and then with water, dried over sodium sulfate, and the ether was distilled off in vacuo. The distillation residue was recrystallized from ethanol, yielding 5.2 gm. of the enolacetate of β-caproyl-γ-phenyl-α-tetronic acid, M.P. 69–70° C., of the formula shown in Example I(i).

The compounds according to the present invention, i.e. those embraced by Formula I above, exhibit highly effective antiphlogistic and antipyretic activities, coupled with very low toxicity. For instance, the α-enolacetate of β-(α',α'-dimethyl-propionyl)-γ-phenyl-α-tetronic acid, administered by introperitoneal injection, produces at a dose of as low as 20 mgm./kg. a reduction of 33% of the edema swelling artificially induced in rats' paws with formalin. The same dose, administered in the same manner, also produces a reduction of 3.0° C. of the body temperature in rats. The intraperitoneal $DL_{50}$ of the compound in rats is 340 mgm./kg. Other members of the group of compounds represented by Formula I exhibit a still greater antiphlogistic activity or a greater antipyretic activity or have a still lower $DL_{50}$.

The discovery that the compounds according to the present invention have the above indicated advantageous combination of properties is surprising in view of the fact that known α-enolaclyates of β-acyl-α-tetronic acids, which are either unsubstituted in the γ-position or have an aliphatic substituent attached to the ring in that position, exhibit antiphlogistic activities only at lethal doses and completely lack antipyretic activities.

For therapeutic purposes the compounds according to the present invention are administered in the form of dosage unit compositions consisting essentially of a therapeutically effective amount of one or more of the compounds embraced by Formula I above and a suitable inert carrier and, if desired, additional therapeutic agents such as analgesics, antipyretics, antiphlogistic muscle relaxants and tranquilizers. The individual effective does of the compounds of the present invention is between 30 and 250 mgm., and the maximum daily dose rate is 800 mgm.

The following examples illustrate typical dosage unit compositions which may be used to administer the compounds of the present invention for therapeutic purposes. The parts are parts by weight unless otherwise specified.

EXAMPLE VI

*Tablets*

The tablets are compounded from the following ingredients:

| | Parts |
|---|---|
| α-Enolacetate of β-(n-hexanoyl)-γ-phenyl-α-tetronic acid | 150.0 |
| Potato starch, dry | 54.0 |
| Gelatin | 2.0 |
| Glycerin | 2.0 |
| Talcum | 10.0 |
| Magnesium stearate | 2.0 |
| Total | 220.0 |

*Compounding procedure.*—The enolacetate and the potato starch are admixed with each other, and the resulting mixture is moistened with a mixture consisting of the glycerin and a 5% aqueous solution of the gelatin. The moist mass is passed through a 1.5 mm.-mesh screen, dried at 45° C. and again passed through the screen. The resulting dry granulate is then admixed and blended with a mixture of the talcum and the magnesium stearate which had been screened through a 0.75 mm.-mesh screen. The resulting mixture is then pressed into tablets weighing 220 mgm. each. Each tablet contains 150 mgm. of the active ingredient.

EXAMPLE VII

*Coated Pills*

The pill cores are compounded from the following ingredients:

| | Parts |
|---|---|
| α-Enolacetate of β-(α-methylhexanoyl)-γ-phenyl-α-tetronic acid | 150.0 |
| Corn starch, dry | 54.0 |
| Polyvinylpyrrolidone | 2.0 |
| Glycerin | 2.0 |
| Talcum | 10.0 |
| Magnesium stearate | 2.0 |
| Total | 220.0 |

*Compounding procedure.*—The α-enolacetate and the corn starch are admixed with each other and the resulting mixture is moistened with a mixture consisting of the glycerin and a 5% aqueous solution of the polyvinylpyrrolidone. The moist mass is passed through a 1.5 mm.-mesh screen, dried at 45° C. and again passed through the screen. The resulting dry granulate is then admixed and blended with a mixture of the talcum and the magnesium stearate which had been screened through a 0.75 mm. screen. The resulting mixture is pressed into pill cores weighing 220 mgm. each, and these pill cores are provided with a thin coating consisting essentially of talcum and sugar. The coated pills are then polished with bees' wax. Each coated pill weighs approximately 350 mgm. and contains 150 mgm. of the active ingredient.

EXAMPLE VIII

Suppositories

The suppositories are compounded from the following ingredients:

| | Parts |
|---|---|
| $\alpha$-Enolacetate of $\beta$-isobutyryl-$\gamma$-(p-chlorophenyl)-$\alpha$-tetronic acid | 250.0 |
| Suppository base (cocoa butter) | 1450.0 |
| Total | 1700.0 |

*Compounding procedure.*—The finely powdered enolacetate is stirred into the molten suppository base at 37° C., and the resulting mixture is cooled to 33° C. and poured into cooled suppository molds holding 1700 mgm. each. Each suppository contains 250 mgm. of the active ingredient.

EXAMPLE IX

Suspension 100 cc. of suspension are compounded from the following ingredients:

| | gm. |
|---|---|
| $\alpha$-Enolacetate of $\beta$-heptanoyl-$\gamma$-phenyl-$\alpha$-tetronic acid | 1.0 |
| Carboxymethyl cellulose | 0.5 |
| Sugar | 22.0 |
| Silicon dioxide, finely milled | 1.5 |
| p-Hydroxybenzoic acid methyl ester | 0.07 |
| p-Hydroxybenzoic acid propyl ester | 0.03 |
| Tangerine flavoring | 0.1 |
| Glycerin | 10.0 |
| Distilled water | 72.0 |
| Total | ¹ 107.2 |

¹ Equals 100 cc.

*Compounding procedure.*—The distilled water is heated to 80° C., and the p-hydroxybenzoic acid esters and a mixture of the carboxy-methyl cellulose and the sugar are dissolved therein by stirring. Thereafter, the solution is cooled to room temperature, and the finely powdered enolacetate and silicon dioxide are suspended therein, using an immersion-homogenizer. Finally, the glycerin and the tangerine flavoring are added. 5 cc. of the finished suspension contain 50 mgm. of the active ingredient.

EXAMPLE X

Tablets With an Enolacetate of the Invention and Phenacetin as Active Ingredients The tablets are compounded from the following ingredients:

| | Parts |
|---|---|
| $\alpha$-Enolacetate of $\beta$-(n-hexanoyl)-$\gamma$-phenyl-$\alpha$-tetronic acid | 100.0 |
| Phenacetin | 150.0 |
| Polyvinylpyrrolidone | 3.0 |
| Glycerin | 5.0 |
| Potato starch | 100.0 |
| Magnesium stearate | 2.0 |
| Total | 360.0 |

*Compounding procedure.*—A mixture of the enolacetate and the Phenacetin is granulated with a mixture consisting of the glycerin and a 6% aqueous solution of the polyvinylpyrrolidone. The moist mass is passed through a 1.5 mm.-mesh screen, dried at 45° C. and again passed through the same screen. The resulting dry granulate is admixed with a mixture consisting of the potato starch and the magnesium stearate, and the composition thus obtained is pressed into tablets weighing 360 mgm. each. Each tablet contains 100 mgm. of the enolacetate and 150 mgm. of Phenacetin.

EXAMPLE XI

Coated Pills With an Enolacetate of the Invention and $\Delta'$-Dehydrocortisone as Active Ingredients The pill cores are compounded from the following ingredients:

| | Parts |
|---|---|
| $\alpha$-Enolacetate of $\beta$-(n-hexanoyl)-$\gamma$-phenyl-$\alpha$-tetronic acid | 100.0 |
| $\Delta'$-Dehydrocortisone | 1.0 |
| Lactose, powdered | 40.0 |
| Corn starch, dried | 40.0 |
| Gelatin | 2.0 |
| Corn starch, undried | 35.0 |
| Magnesium stearate | 2.0 |
| Total | 220.0 |

*Compounding procedure.*—The enolacetate, the dried corn starch and a milled mixture of the $\Delta'$-dehydrocortisone and the lactose are admixed with each other, and the resulting mixture is granulated with a 5% aqueous solution of the gelatin. The moist mass is passed through a 1.5 mm.-mesh screen, dried at 40° C. and again passed through the same screen. The dry granulate thus obtained was admixed with a mixture consisting of the undried corn starch and the magnesium stearate, which had been screened through a 0.75 mm.-mesh screen. The resulting composition is pressed into pill cores weighing 220 mgm. each, which are then provided with a thin coating consisting essentially of talcum and sugar. The coated pills are finally polished with bees' wax. Each coated pill weighs approximately 350 mgm. and contains 100 mgm. of the enolacetate and 1 mgm. of $\Delta'$-dehydrocortisone.

EXAMPLE XII

Tablets With an Enolacetate of the Invention and Dimethylamino-Phenyl-Dimethyl-Pyrazolone as Active Ingredients The tablets are compounded from the following ingredients:

| | Parts |
|---|---|
| $\alpha$-Enolacetate of $\beta$-($\alpha'$-methylhexanoyl)-$\gamma$-phenyl-$\alpha$-tetronic acid | 150.0 |
| Dimethylamino-phenyl-di-methyl-pyrazolone | 150.0 |
| Gelatin | 4.0 |
| Corn starch, undried | 88.0 |
| Silicon dioxide, finely milled | 4.0 |
| Magnesium stearate | 4.0 |
| Total | 400.0 |

*Compounding procedure.*—A mixture consisting of the enolacetate and the dimethylamino-phenyl-dimethyl-pyrazole is granulated with a 5% aqueous solution of the gelatin. The resulting moist granulate is passed through a 1.5 mm.-mesh screen, dried at 45° C. and again passed through the screen. The dry granulate thus obtained is admixed wtih a mixture consisting of the undried corn starch, the silicon dioxide and the magnesium stearate, which had been screened through a 0.75 mm.-mesh screen. The resulting compoistion was then pressed into tablets weighing 400 mgm. each. Each tablet contains 150 mgm. of the enolacetate and 150 mgm. of the dimethylamino- phenyl-dimethylpyrazolone.

EXAMPLE XIII

*Coated Pills With an Enolacetate of the Invention and Phenyl-Dimethylpyrazolone as Active Ingredients*

The pill cores are compounded from the following ingredients:

| | Parts |
|---|---|
| α-Enolacetate of β-isobutyryl-γ-(p-chlorophenyl)-α-tetronic acid | 100.0 |
| Phenyl-dimethylpyrazolone | 200.0 |
| Polyvinylpyrrolidone | 5.0 |
| Glycerin | 5.0 |
| Potato starch, undried | 86.0 |
| Magnesium stearate | 4.0 |
| Total | 400.0 |

*Compounding procedure.*—A mixture consisting of the enolacetate and the phenyl-dimethyl-pyrazolone is granulated with a 6% aqueous solution of the polyvinylpyrrolidone containing the glycerin, the moist granulate is passed through a 1.5 mm.-mesh screen, dried at 45° C. and again passed through the screen. The dry granulate thus obtained is admixed with a mixture consisting of the undried potato starch and the magnesium stearate, which had been screened through a 0.75 mm.-mesh screen. The resulting composition is pressed into pill cores weighing 400 mgm. each, which are then provided with a thin shell consisting essentially of talcum and sugar. The coated pills are finally polished with bees' wax. Each pill weighs approximately 600 mgm. and contains 100 mgm. of the enolacetate and 200 mgm. of the phenyl-dimethyl-pyrazolone.

EXAMPLE XIV

*Tablets With an Enolacetate of the Invention and 2-Methyl-2-Propyl-1,3-Propanediol-Dicarbamate as Active Ingredients*

The tablets are compounded from the following ingredients:

| | Parts |
|---|---|
| α-Enolacetate of β-(n-heptanoyl)-γ-phenyl-α-tetronic acid | 100.0 |
| 2-methyl-2-propyl-1,3-propane-diol-dicarbamate | 200.0 |
| Potato starch, dried | 100.0 |
| Polyvinylpyrrolidone | 10.0 |
| Silicon dioxide, finely milled | 10.0 |
| Potato starch, undried | 175.0 |
| Magnesium stearate | 5.0 |
| Total | 600.0 |

*Compounding procedure.*—A mixture consisting of the enolacetate, the 2-methyl-2-propyl-1,3-propanediol-dicarbamate and the dried potato starch is granulated with a 12% aqueous solution of the polyvinylpyrrolidone, the moist granulate is passed through a 1.5 mm.-mesh screen, dried at 45° C. and again passed through the screen. The dry granulate thus obtained is admixed with a mixture consisting of the magnesium stearate and the undried potato starch, which has been screened through a 0.75 mm.-mesh screen. The resulting composition is then pressed into tablets weighing 600 mgm. each. Each tablet contains 100 mgm. of the enolacetate and 200 mgm. of the 2-methyl-2-propyl-1,3-propanediol-dicarbamate.

While I have illustrated the present invention with the aid of certain specific embodiments, it will be readily apparent to others skilled in the art that my invention is not limited to these specific embodiments, and that various other changes and modifications may be made without departing from the spirit of the invention or the scope of the appended claims.

I claim:

1. A β-acyl-γ-phenyl-α-tetronic acid α-enolalkonate of the formula

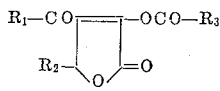

wherein $R_1$ is selected from the group consisting of alkyl with 1 to 9 carbon atoms and lower alkenyl, $R_2$ is selected from the group consisting of phenyl, chloro-phenyl, methyl-substituted phenyl, methoxy-substituted phenyl and methylenedioxy-substituted phenyl, and $R_3$ is lower alkyl.

2. The α-enolacetate of β-hexanoyl-γ-phenyl-α-tetronic acid.

3. The α-enolacetate of β-(α'-methylhexanoyl)-γ-phenyl-α-tetronic acid.

4. The α-enolacetate of β-isobutyryl-γ-(p-chlorophenyl)-α-tetronic acid.

5. The α-enolacetate of β-heptanoyl-γ-phenyl-α-tetronic acid.

References Cited in the file of this patent

UNITED STATES PATENTS

| 2,809,182 | Mirr et al. | Oct. 8, 1957 |
| 2,951,083 | Gilbert | Aug. 30, 1960 |
| 2,992,163 | Easton | July 11, 1961 |

FOREIGN PATENTS

| 300,760 | Switzerland | Oct. 16, 1954 |

OTHER REFERENCES

Mumm: Berichte, volume 45 (1912), pages 3236 and 3237.

Wagner et al.: Syn. Org. Chem., New York (1953), Wiley, pages 480–483.

Theilheimer: Syn. Meth. Org. Chem., volume 14 (1960), page 114. (Article No. 228).

Stecher et al.: J. Org. Chem., volume 26 (1961), pages 2693–2698.

UNITED STATES PATENT OFFICE
CERTIFICATE OF CORRECTION

Patent No. 3,121,095                  February 11, 1964

Gerhard Ohnacker

It is hereby certified that error appears in the above numbered patent requiring correction and that the said Letters Patent should read as corrected below.

Column 7, line 65, after "ethanol" insert a closing parenthesis; column 9, lines 38 to 43, for that portion of the formula reading:

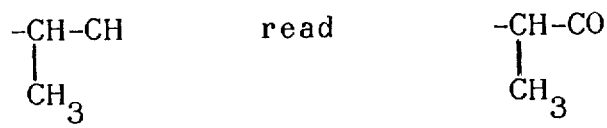

line 70, after "ethanol" insert a closing parenthesis; column 16, line 15, for " α-enolalkonate" read -- α-enolalkanoate --.

Signed and sealed this 30th day of June 1964.

(SEAL)
Attest:

ERNEST W. SWIDER                  EDWARD J. BRENNER

Attesting Officer                Commissioner of Patents